(12) United States Patent
Kolpasky

(10) Patent No.: US 6,827,387 B2
(45) Date of Patent: Dec. 7, 2004

(54) VEHICLE CHILD SEATING APPARATUS AND METHOD OF USE THEREFOR

(75) Inventor: Kevin G. Kolpasky, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/414,324

(22) Filed: Apr. 15, 2003

(65) Prior Publication Data

US 2004/0207227 A1 Oct. 21, 2004

(51) Int. Cl.⁷ .................................................. B60N 2/00
(52) U.S. Cl. ....................................................... 296/64
(58) Field of Search ........................... 296/65.01, 65.03, 296/65.04, 65.09, 69, 64

(56) References Cited

U.S. PATENT DOCUMENTS

| | | | |
|---|---|---|---|
| 4,173,355 A | * 11/1979 | Perego | 280/642 |
| 4,561,690 A | * 12/1985 | Shinjo et al. | 296/155 |
| 5,393,116 A | 2/1995 | Bolsworth et al. | 296/65.1 |
| 5,577,805 A | 11/1996 | Glinter et al. | 297/378.12 |
| 5,660,437 A | 8/1997 | Bauer et al. | 297/237 |
| D428,375 S | * 7/2000 | Bender et al. | D12/99 |
| 6,120,093 A | 9/2000 | Gyllenspetz | 297/216.11 |
| 6,431,632 B1 | 8/2002 | Kozikowski et al. | 296/65.03 |
| 6,655,702 B2 | * 12/2003 | Senger | 296/65.01 |
| 6,663,174 B2 | * 12/2003 | Drage et al. | 297/112 |

FOREIGN PATENT DOCUMENTS

| FR | 2695887 | 3/1994 |
|---|---|---|
| FR | 2777236 | 10/1999 |

OTHER PUBLICATIONS

Page from online brochure of Volvo XC90.
Web page from redart.com—kid seat (www.volvoXC90.com/details/xc90_brochure.pdf).

* cited by examiner

Primary Examiner—Lori L. Coletta
(74) Attorney, Agent, or Firm—Laura C. Hargitt

(57) ABSTRACT

A child seating apparatus is provided. The child seating apparatus includes a child seat having a lower seat portion and a substantially upright seatback portion; a frame configured to directly support the child seat in a raised position above a vehicle floor without a standard adult seat therebetween; and a locking or fastening element configured to removably connect the frame to the floor. Interchangeable child seating apparatuses may be employed to provide enhanced flexibility in vehicle interior arrangements. Accordingly, a method for exploiting the child seating apparatus is also provided.

28 Claims, 4 Drawing Sheets

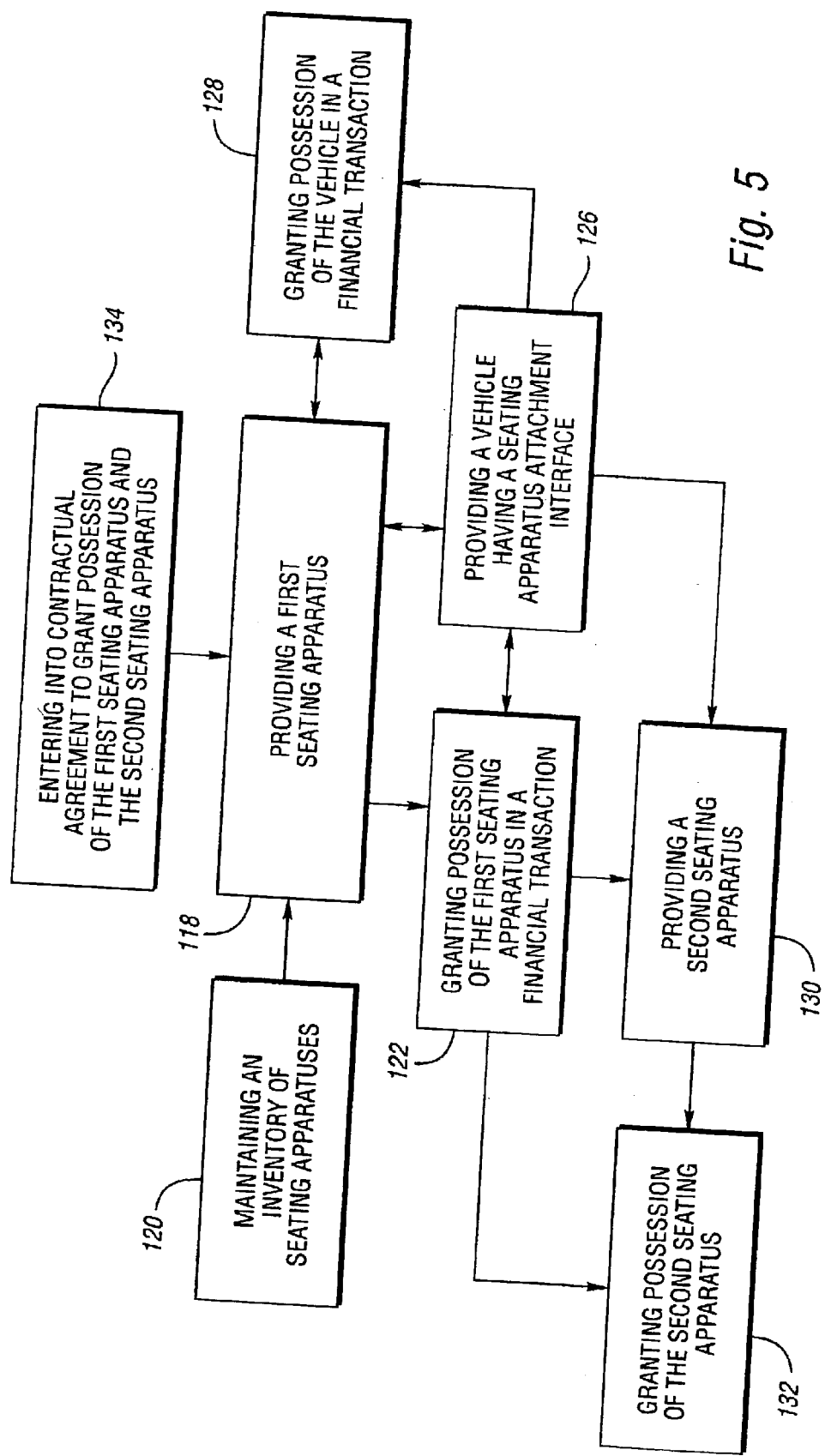

# VEHICLE CHILD SEATING APPARATUS AND METHOD OF USE THEREFOR

TECHNICAL FIELD

This invention relates to vehicle child seats that include a frame for elevating the child seat in a raised position above a vehicle floor without a standard adult seat therebetween.

BACKGROUND OF THE INVENTION

Prior art child seats are typically fastened to an adult seat in a vehicle. When installed in a vehicle, the prior art child seat occupies space that is otherwise normally used for an adult passenger, thus reducing adult seating capacity in the vehicle. The prior art child seat may be cumbersome or difficult to fasten to the adult seat.

Prior art child seats may be uncomfortable for children. Children may require assistance getting into the child seat because of its placement on an adult seat. The placement of the child seat on an adult seat may limit a child's view through a side window to the exterior of the vehicle and may prevent a child from accessing nearby storage compartments or controls for occupant comfort. Furthermore, an adult seat on which a prior art child seat is fastened may prevent an occupant of the child seat from fully and comfortably bending his or her knees.

The prior art includes child seats that are integrated with an adult seat. These integrated child seats may eliminate or reduce the difficulty associated with fastening some prior art child seats to an adult seat, and may be stowed when not in use to provide space for adult passengers. However, the prior art integrated child seats are permanently affixed to adult seats and thus cannot be removed or replaced with a differently sized child seat.

SUMMARY OF THE INVENTION

A child seating apparatus for use in a vehicle is provided. The child seating apparatus includes a child seat that has a lower seat portion and a substantially upright seatback portion. A frame operatively connected to the child seat is configured to directly support the child seat in a raised position above a vehicle floor without a standard adult seat therebetween. At least one locking or fastening element is operatively connected to the, frame and configured to removably operatively connect the frame to the vehicle floor.

Preferably, the frame has a height such that an occupant of the child seat has an unobstructed view through an adjacent side window when the child seating apparatus is installed in the vehicle. The child seating apparatus also preferably includes an integral seat belt system. The child seating apparatus may also include steps operatively connected to the frame that a child can climb to reach the child seat without adult assistance.

The child seating apparatus enables flexibility in the design of child seating not achievable with the prior art. The placement of the prior art child seat on an adult seat results in considerable design constraints. The placement of the child seating apparatus directly on a vehicle floor removes the design constraints of the prior art and enables child seats that are optimized for child comfort. A child seating apparatus is thus essentially a self-contained unit that can be optimized for children of a particular age or size. For example, a child seating apparatus for a toddler may have a higher frame than a child seating apparatus for an older child to elevate the toddler to a more comfortable height in the vehicle. Similarly, integral seat belts ensure a proper seat belt fit for children of a particular age or size.

A vehicle having an interior arrangement adapted to advantageously exploit the child seating apparatus is also provided. The vehicle includes an interface designed to releasably engage a corresponding attachment interface on a child seating apparatus. The vehicle preferably includes comfort amenities within reach of an installed child seating apparatus. Comfort amenities may include, for example, a storage compartment, an HVAC control, a lamp control, etc.

Differently-configured child seating apparatuses for differently-sized children can employ a common attachment interface configuration, thereby enabling the differently-configured child seating apparatuses to be interchangeable with one another in a vehicle. Accordingly, a method for advantageously employing the child seating apparatus is also provided.

The above features and advantages, and other features and advantages, of the present invention are readily apparent from the following detailed description of the best modes for carrying out the invention when taken in connection with the accompanying drawings.

BRIEF DESCRIPTION OF THE DRAWINGS

FIG. 5 is a flow chart depicting a method for advantageously employing a child seating apparatus.

DESCRIPTION OF THE PREFERRED EMBODIMENTS

Figure 1:
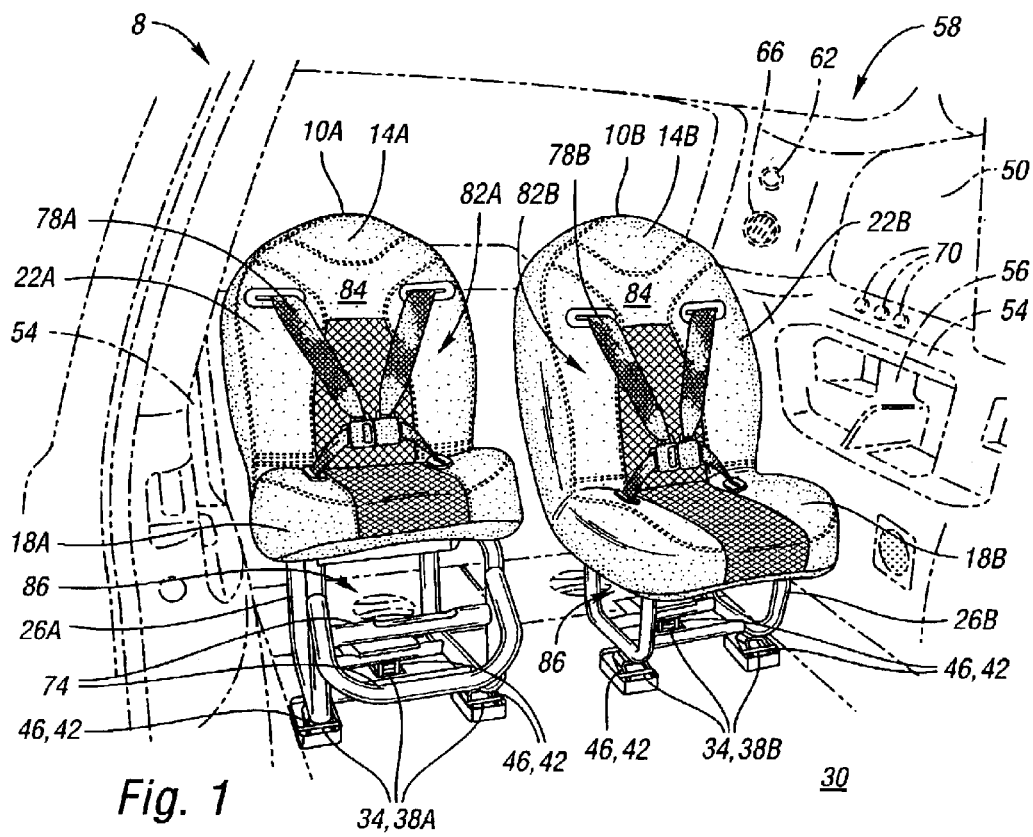
FIG. 1 is a schematic perspective view of a first selection of child seating apparatuses according to the invention installed in a vehicle body.

FIG. 1 is a schematic depiction of two child seating apparatuses installed in a vehicle having a body 8. The child seating apparatuses include a first version 10A configured for a toddler and a second version 10B configured for an older child. The child seating apparatuses 10A, 10B each include a child seat 14A, 14B having a lower seat portion 18A, 18B and a substantially upright seatback portion 22A, 22B. Each child seat 14A, 14B is connected to a frame 26A, 26B which directly supports the child seat 14A, 14B in a raised position above a vehicle floor 30 without a standard adult seat therebetween. The frames 26A, 26B depicted are not adjustable and have a fixed height; however, within the scope of the claimed invention, a frame may be adjustable to selectively change the height of a child seat above the floor. The vehicle body 8 includes a plurality of locking or fastening elements 34 that are arranged in a predetermined spatial relationship with one another and that define body interfaces 38A, 38B at which the child seating apparatuses 10A, 10B are mounted with respect to the body 8. Each child seating apparatus 10A, 10B includes a seating interface 42 for connecting the child seating apparatus 10A, 10B with respect to the vehicle body 8. Each seating interface 42 has a plurality of locking or fastening elements 46 having the same predetermined spatial relationship with one another as the spatial relationship of the locking or fastening elements 34 in one of the body interfaces 38A, 38B. The locking or fastening elements 46 are engageable with locking or fastening elements 34 such that the seating interfaces 42 are engageable with the body interfaces 38A, 38B to connect the seating apparatuses 10A, 10B to the body 8.

Those skilled in the art will recognize a variety of releasably engageable locking or fastening elements that may be employed within the scope of the claimed invention. Exemplary locking or fastening elements for use in releasably mounting a vehicle seat with respect to a floor are described in U.S. Pat. No. 5,577,805, issued Nov. 26, 1996 to Glinter, et al; U.S. Pat. No. 5,393,116, issued Feb. 28, 1995 to Bolsworth, et al; and U.S. Pat. No. 6,431,632, issued Aug. 13, 2002 to Kozikowski et al; which are hereby incorporated by reference in their entireties. The locking or fastening elements 46 depicted in FIG. 1 are latches that engage strikers 34 that are located in recessed areas in the floor 30. However, it may be preferable for the forwardmost locking or fastening elements on a child seating apparatus to be brackets defining slots or notches that accept and retain strikers, and the rear locking or fastening element to be a latch. A seating apparatus having such a configuration would be installed by positioning the brackets so that the strikers enter respective notches, and then rotating the seating apparatus about the engaged strikers until the latch engages a striker. Such a configuration enables the removal of a child seating apparatus with the release of only one latch.

The child seat 14A of the first version 10A is smaller in size than the child seat 14B of the second version 10B. The frame 26A of the first version 10A is configured specifically for the comfort of a small toddler-aged child, and the frame 26B of the second version 10B is configured specifically for the comfort of an older child larger than a toddler. The frame 26A extends higher than frame 26B so that lower seat portion 18A is higher in the vehicle than lower seat portion 18B and ensures that a toddler-sized occupant of the first version 10A has a satisfactory view out an adjacent side window 50. Similarly, frame 26B is lower in height than frame 26A so that child seat 14B does not obscure a driver's view, and so that the feet of an occupant of the second version 10B can reach the floor 30. The lower seat portions 18A, 18B are appropriately dimensioned so that the legs of an occupant can bend comfortably at the knee.

The vehicle body 8 also includes interior trim panels 54 defining storage compartments 56 adjacent to the child seating apparatuses 10A, 10B. The floor 30, windows 50, and trim panels 54 at least partially define a vehicle interior 58. The vehicle body 8 preferably includes a lamp 62 sufficiently positioned within the vehicle body 8 to illuminate an area adjacent to one of the child seating apparatuses 10B. The vehicle also preferably includes a heating, ventilating, and air conditioning system that has a vent 66 sufficiently positioned within the body 8 to direct air flow to the child seating apparatuses 10A, 10B. The windows 50 are preferably selectively tintable.

Controls 70 for the heating, ventilating, and air conditioning system 66, the lamp 62, and the window 50 are sufficiently positioned within the vehicle interior 58 with respect to a body interface 38B such that they are accessible to an occupant of a child seating apparatus 10B mounted at the interface 38B.

The first version 10A preferably includes tiered steps 74 to enable a child to occupy the child seat 14A without adult assistance. The tiered steps 74 may also function as a foot rest in the event that a child's feet cannot reach the floor 30.

Each child seating apparatus 10A, 10B also includes an integral four point seat belt system 78A, 78B.

Each child seat 14A, 14B defines an occupiable surface 82A, 82B upon which or against which an occupant rests. The contours of each occupiable surface 82A, 82B define a concavity 84 to properly locate a child on the occupiable seating surface 82A, 82B and with respect to one of the integral seat belt systems 78A, 78B. The contours are preferably pliable and non-rigid. The frames 26A, 26B each define an open space 86 under each child seat 14A, 14B wherein vehicle cargo may be stored.

Figure 2:
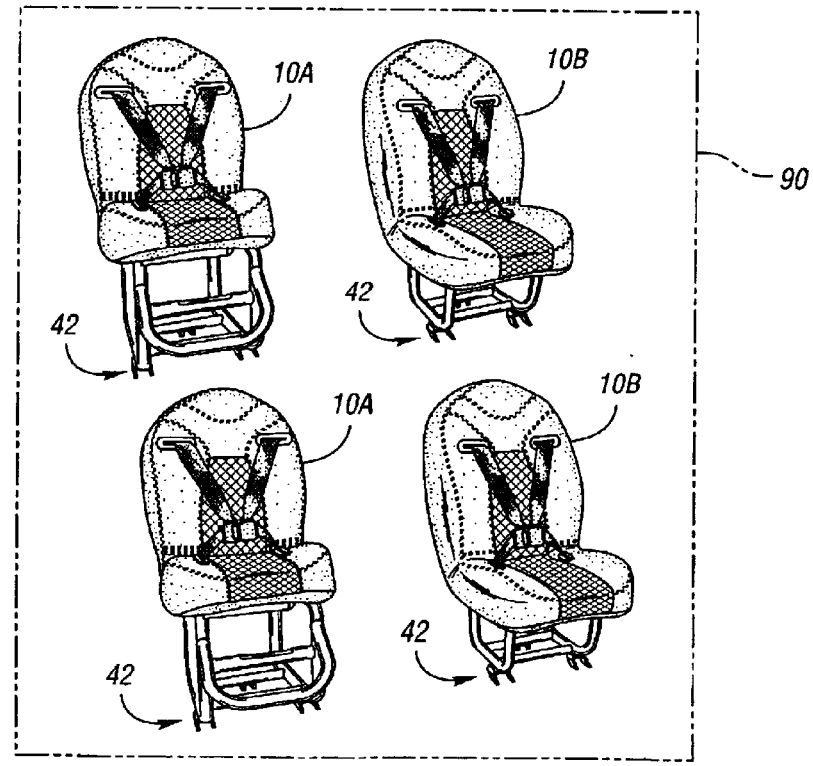
FIG. 2 is a schematic illustration of an inventory of child seating apparatuses from which the child seating apparatuses of FIG. 1 were selected.

FIG. 2, wherein like reference numbers refer to like components from FIG. 1, schematically depicts an inventory 90 having a plurality of child seating apparatuses, including the first version 10A and the second version 10B. The seating interfaces 42 of the plurality of child seating apparatuses 10A, 10B in the inventory 90 are substantially identical to one another and engageable with the body interfaces 38A, 38B of FIG. 1. The child seating apparatuses 10A, 10B of FIG. 1 are preferably selected from the inventory 90. Within the scope of the claimed invention, the inventory 90 may include adult seats (not shown) having a seating interface engageable with the body interfaces 38A, 38B of FIG. 1.

Figure 3:
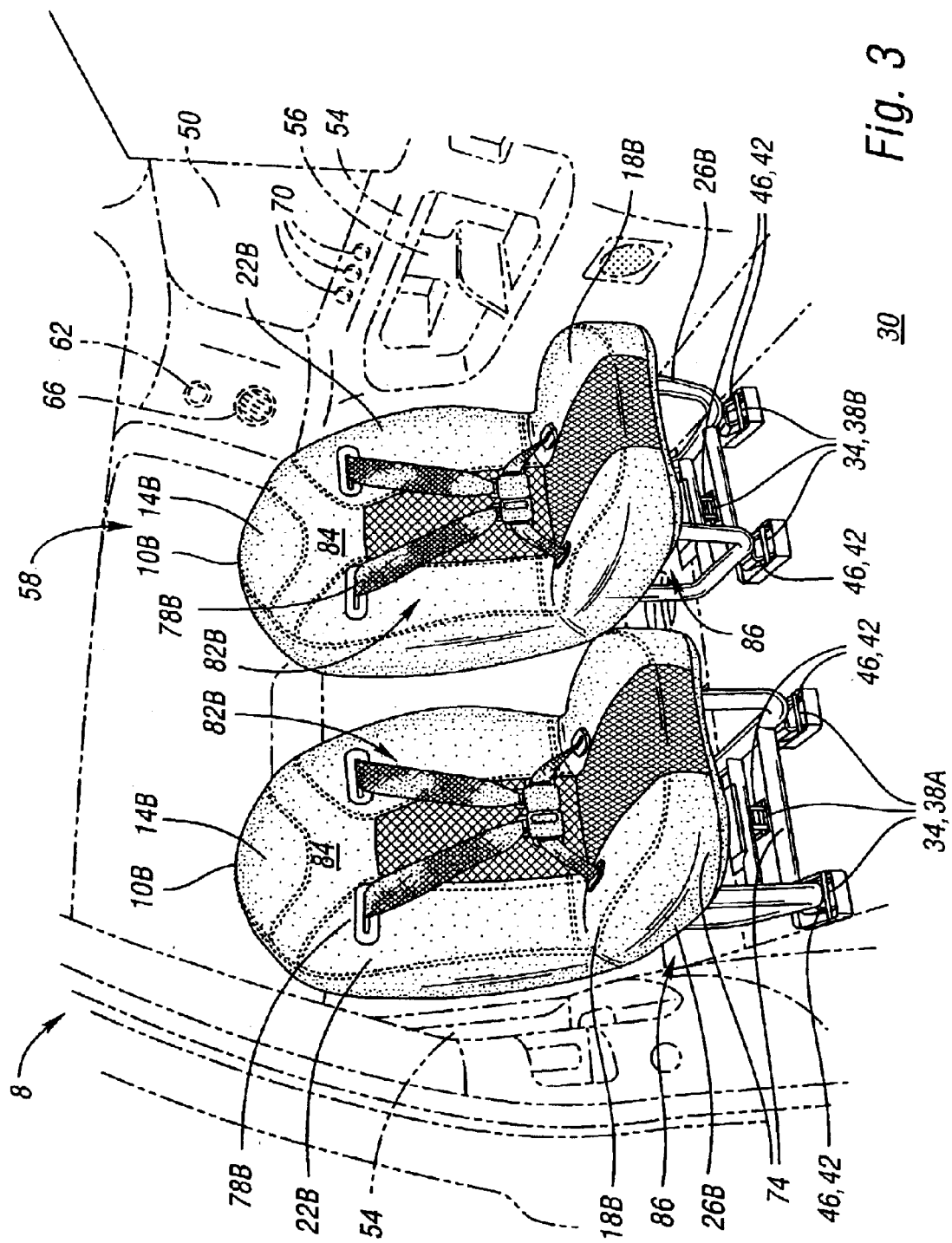
FIG. 3 is a schematic perspective view of the vehicle body of FIG. 1 with a second selection of child seating apparatuses selected from the inventory of FIG. 2.

A vehicle user may select a child seating apparatus of the first version 10A from the inventory 90 when a child is a toddler. When the child outgrows the first version 10A and requires a larger and differently-configured seat, the second version 10B can be selected from the inventory 90 and installed on a vehicle to replace the first version 10A. Similarly, when the child is large enough for a standard adult seat, an adult seat could be selected from the inventory 90 and installed on a vehicle to replace the second version 10B. FIG. 3, wherein like reference numbers refer to like components from FIGS. 1 and 2, depicts the vehicle body 8 of FIG. 1 with the first version removed and replaced by a child seating apparatus conforming to the second version 10B. The controls 70 are preferably sufficiently positioned with respect to a body interface 38B such that they are accessible to an occupant of any of the seating apparatus versions in the inventory.

Figure 4:
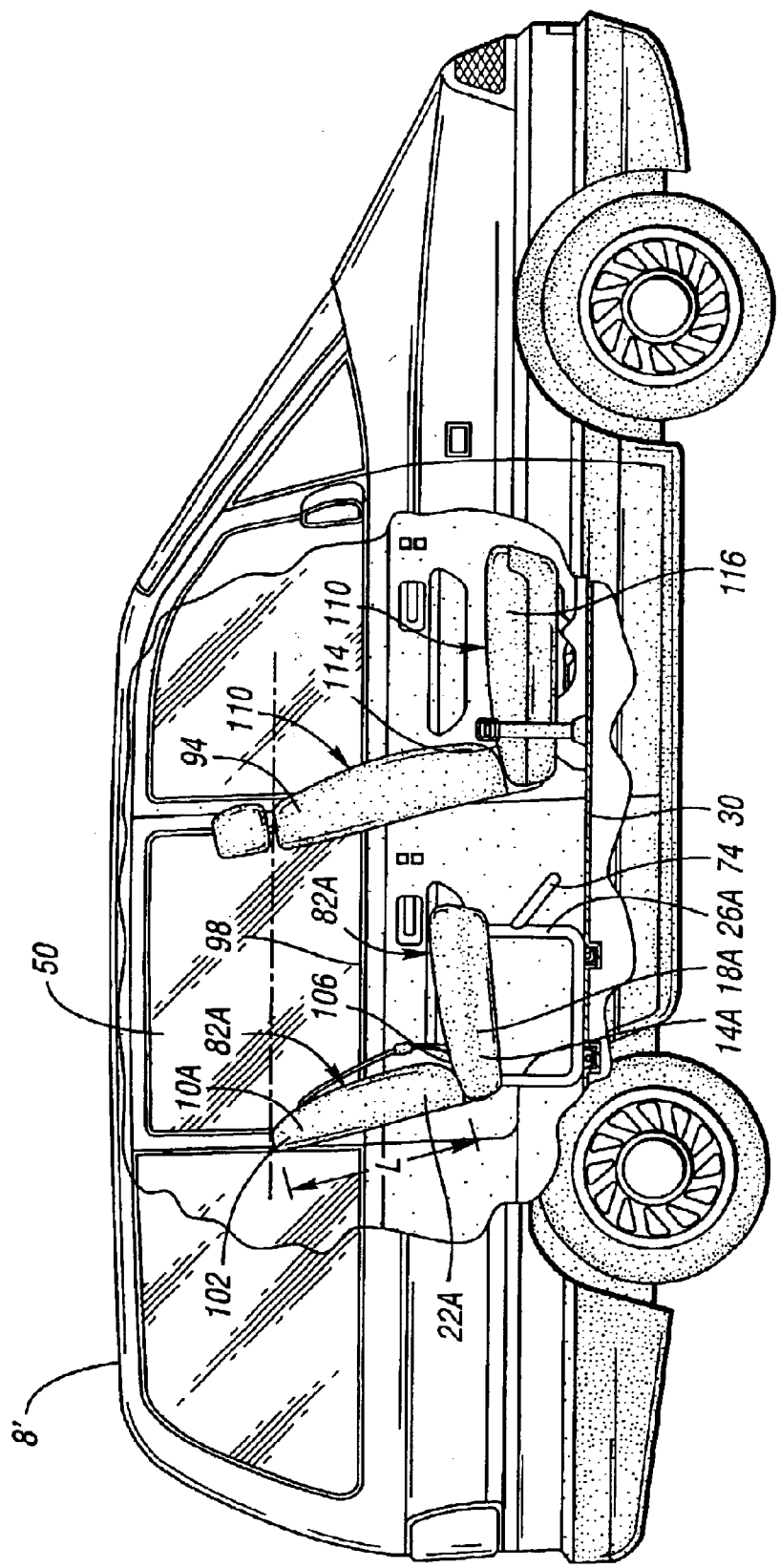
FIG. 4 is a schematic cut-away side view of a child seating apparatus operatively connected to a vehicle body.

FIG. 4, wherein like reference numbers refer to like components from FIGS. 1-3, is a schematic depiction of a child seating apparatus 10A within a vehicle body 8' to illustrate preferred relationships between an installed child seating apparatus 10A, an adjacent side window 50 and a standard adult seat 94 that is larger than child seat 14A. The window 50 extends upward from a lower window extent 98. At least a portion 102 of the seatback portion 22A extends higher than the lower window extent 98 to ensure that an occupant of the child seating apparatus 10A has an unobstructed view to the exterior of the vehicle body 8'. More specifically, the seatback portion 22A is characterized by a length L, and the uppermost half of the seatback portion length L extends higher than the lower window extent 98.

The occupiable surface 82A extends upward from a lower child seat occupiable surface extent 106. The adult seat 94 is connected to the floor 30 within the vehicle body 8' and includes an occupiable surface 110 extending upward from a lower adult seat occupiable surface extent 114. To ensure that an occupant of the child seating apparatus 10A is not isolated from other passengers of the vehicle, the lower child seat occupiable surface extent 106 is at least as high as the lower adult seat occupiable surface extent 114. More generally, at least a portion of the lower seat portion 18A is higher than adult lower seat portion 116. The child seating apparatus 10A preferably does not extend higher than the adult seat 94.

Referring to FIG. 5, a method of advantageously employing the child seating apparatus is schematically depicted. The interchangeability of child seating apparatuses can be advantageously used to ensure that a child has a properly sized and positioned child seat for use in a vehicle and provides enhanced flexibility in vehicle seating arrangements compared to the prior art. Accordingly, the method includes providing a first seating apparatus 118. The first seating apparatus is selected from an inventory having a plurality of seating apparatuses. Each of the seating apparatuses in the plurality of seating apparatuses includes a seat having a lower seat portion and a substantially upright seatback portion, a frame configured to directly support the seat in a raised position above a vehicle floor of a vehicle body without a standard adult seat between the seat and the floor, and a seating interface releasably engageable with a body interface on the vehicle body to removably connect the frame with respect to the vehicle body.

The seating interfaces of the plurality of seating apparatuses are substantially identical to one another so that the seating apparatuses are interchangeable with one another on the body interface. The plurality of seating apparatuses in the inventory includes a first version and a second version. The first version is characterized by a first size and a first shape. The second version is characterized by a second size and a second shape. The first size is different from the second size or the first shape is different from the second shape. Thus, the inventory is a supply of differently-configured, interchangeable seating apparatuses. It may be advantageous for the method to further include maintaining the inventory 120.

For example, a general retailer may maintain the inventory and provide the first seating apparatus to a consumer who selects it based on the present size of a child. Similarly, a vehicle retailer may maintain the inventory and provide the first seating apparatus to a consumer. A vehicle rental company may provide the first seating apparatus to a consumer who is renting a vehicle having a body interface engageable with the seating interfaces of the seating apparatuses in the inventory. The vehicle rental company may thus interchange seating apparatuses to accommodate the needs of a particular consumer with a child of a particular size. The method may also include granting possession of the first seating apparatus in a financial transaction 122. For example, the first seating apparatus may be sold, leased, or rented to a consumer.

The method may also further comprise providing a vehicle having a body interface engageable with the seating interface of the first seating apparatus 126 and/or granting possession of the vehicle in a financial transaction 128. It may be advantageous in certain circumstances for a vehicle manufacturer or a retailer to provide the purchaser or lessee of a vehicle with the service of providing differently sized seating apparatuses to accommodate the growth of a child. For example, a larger child seat may be needed, or a child may require an adult seat. Accordingly, the method may further comprise providing a second seating apparatus at a time subsequent to said granting possession of the first seating apparatus, the second seating apparatus being a different version from the first seating apparatus 130, and/or granting possession of the second seating apparatus in a financial transaction 132. Consumers may find it convenient for this service to be part of an initial vehicle sales or lease contract. Accordingly, the method may further comprise entering into a contractual agreement to grant possession of the first seating apparatus and to grant possession of the second seating apparatus usable at a time subsequent to using the first seating apparatus 134.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

What is claimed is:

1. A seating apparatus for a child for use in a vehicle having a floor supporting an adult seat, the seating apparatus comprising:

a child seat smaller than the adult seat, the child seat including a lower seat portion and a substantially upright seatback portion; a frame configured to directly support the child seat in a raised position above the floor without a standard adult seat between the child seat and the floor; and a locking or fastening element configured to removably operatively connect the frame to the floor; and wherein the vehicle includes a window extending upward from a lower window extent, and wherein the frame has a sufficient height such that at least a portion of the seatback portion is raised higher than the lower window extent when the frame is operatively connected to the floor.

2. The seating apparatus of claim 1, wherein the seatback portion is characterized by a dimension, and wherein the uppermost half of the seatback portion dimension is higher than the lower window extent when the frame is operatively connected to the floor.

3. The seating apparatus of claim 1, wherein the child seat defines an occupiable surface extending upward from a lower child scat occupiable surface extent; wherein the adult seat defines an occupiable surface extending upward from a lower adult seat occupiable surface extent; and wherein the frame has a height sufficient such that the lower child seat occupiable surface extent is at least as high as the lower adult seat occupiable surface extent when the frame is operatively connected to the floor.

4. The seating apparatus of claim 1, further comprising an integral seat belt operatively connected to the child seat.

5. The seating apparatus of claim 1, further comprising an integral foot rest operatively connected to the frame.

6. The seating apparatus of claim 1, wherein the child seat defines an occupiable surface, and wherein the contours of the occupiable surface define a concavity for positively locating a child on the occupiable surface.

7. The seating apparatus of claim 6, wherein the contours of the occupiable surface are pliable or non-rigid.

8. The seating apparatus of claim 1, wherein the frame at least partially defines an open space under the child seat for the storage of vehicle cargo.

9. The seating apparatus of claim 1, further comprising at least one step operatively connected to the fame such that a child can employ said at least one step to leach the child seat.

10. A vehicle comprising:

a vehicle body including a floor and a window, the floor and the window partially defining an interior space, and the window extending upward from a lower window extent;

a child seating apparatus having a child seat including a lower seat portion and a substantially upright seatback portion, a frame directly supporting the child seat in a raised position above the floor without a standard adult seat therebetween; and an adult seat mounted with respect to the vehicle body and located within the interior space, the adult seat defining an adult seat occupiable surface extending upward from a lower adult seat occupiable surface extent;

wherein the body is characterized by a body interface having at least one locking or fastening element; wherein the child seating apparatus includes a seating interface complementary to the body interface and having at least one complementary locking or fastening element releasably engageable with said at least one locking or fastening element in the body interface; and wherein the seating interface is operatively engaged with the body interface to connect the child seating apparatus to the body; and wherein the child seat defines an occupiable surface extending upward from a lower child seat occupiable surface extent; and wherein the lower child seat occupiable seating surface extent is at least as high as the lower adult seat occupiable surface extent.

11. The vehicle of claim 10, wherein the lower child seat occupiable seating surface extent is higher than the lower adult seat occupiable surface extent.

12. The vehicle of claim 10, wherein at least a portion of the seatback portion extends higher than the lower window extent.

13. The vehicle of claim 11, wherein the uppermost half of the seatback portion is hither than the lower window extent when the frame is operatively connected to the floor.

14. The vehicle of claim 10, wherein the child seating apparatus includes an integral footrest operatively connected to the fame.

15. The vehicle of claim 10, further comprising at least one member defining a storage compartment adjacent to the child seat.

16. The vehicle of claim 10, further comprising an HVAC system including a vent sufficiently positioned to direct airflow to the child seat; and a control for the HVAC system adjacent to the child seat.

17. The vehicle of claim 10, further comprising a lamp and a control for the lamp adjacent the child seat.

18. The vehicle of claim 10, wherein the child seating apparatus is selected from an inventory having a plurality of child seating apparatuses, each of the child seating apparatuses in the plurality of child seating apparatuses including a child seat, a frame, and a seating interface releasably operatively engageable with the body interface on the body;

wherein the plurality of child seating apparatuses in the inventory includes a first version and a second version of child seating apparatus;

wherein the first version of child seating apparatus is characterized by a first size and a first shape; wherein the second version of child seating apparatus is characterized by a second size or a second shape; and wherein the first size is different from the second size or the first shape is different from the second shape.

19. The vehicle of claim 10, wherein the child seating apparatus includes at least one step operatively connected to the frame such that a child can employ said at least one step to reach the child seat.

20. A method for providing flexibility in child seating arrangements in a vehicle, the method comprising:

providing a first seating apparatus;

wherein the first seating apparatus is selected from an inventory having a plurality of seating apparatuses, each of the seating apparatuses in the plurality of seating apparatuses including a seat having a lower seat portion and a substantially upright seatback portion; a fine configured to directly support the seat in a raised position above a vehicle floor without a standard adult seat therebetween; and a seating interface releasably engageable with a corresponding body interface on a vehicle body to removably connect the frame with respect to the vehicle body;

wherein the seating interfaces of the plurality of seating apparatuses are substantially identical to one another so that the seating apparatuses are interchangeable with one another on the body interface; and wherein the plurality of seating, apparatuses in the inventory includes a first version and a second version, the first version being characterized by the frame having a first size and a first shape when connected with respect to the vehicle body, the second version bring characterized by the frame having a second size and a second shape when connected with respect to the vehicle body, the first size being different from the second size or the first shape being different from the second shape such that the frame of the first version raises the corresponding lower seat portion higher above the floor than the frame of the second version.

21. The method of claim 20, further comprising maintaining the inventory.

22. The method of claim 20, further comprising granting possession of the first seating apparatus in a financial transaction.

23. The method of claim 20, further comprising providing a vehicle having a body interface engageable with the seating interface of the first seating apparatus.

24. The method of claim 23, further comprising granting possession of the vehicle and tile fist seating apparatus in a financial transaction.

25. The method of claim 20, further comprising providing a second child seating apparatus usable at a time subsequent to using the first seating apparatus, the second seating apparatus being a different version from the first seating apparatus.

26. The method of claim 25, further comprising entering into a contractual agreement to grant possession of the first seating apparatus and to grant possession of the second seating apparatus usable at a time subsequent to using the first seating apparatus.

27. A vehicle characterized by a flexible child seating arrangement, the vehicle comprising;

a body including a floor, a body interface having at least one locking or fastening element and being configured to operatively connect any one of a plurality of child seating apparatuses to the floor;

wherein each of the plurality of child seating apparatuses includes a child seat including a lower seat portion for supporting a child passenger and a substantially upright seatback portion, a frame directly supporting the child scat in a raised position above the floor without a standard adult seat therebetween, and a seating interface complementary to the body interface and having at least one complementary locking or fastening element engageable with said at least one locking or fastening element in the body interface;

wherein the plurality of child seating apparatuses includes a first version characterized by the frame having a first size and shape when supporting the corresponding child seat above the vehicle floor and a second version characterized by the frame having a second size and shape when supporting the corresponding child seat above the vehicle floor, and wherein the first size is different from the second size, or the first shape is different from the second shape such that the lower seat portion of the first version is raised higher above the floor than the lower seat portion of the second version.

28. A vehicle comprising:

a vehicle body including a floor and a window, the floor and the window partially defining an interior space, and the window extending upward from a lower window extent; and a child seating apparatus having
- a child seat including a lower seat portion and a substantially upright seatback portion,
- a frame directly supporting the child seat in a raised position above the floor without a standard adult seat therebetween,
- an integral seat belt operatively connected to the child seat, and
- at least one step operatively connected to the frame such that a child can employ said at least one step to reach the child seat;

wherein the body is characterized by a body interface having at least one locking or fastening element; wherein the child seating apparatus includes a seating interface complementary to the body interface and having at least one complementary locking or fastening element releasably engageable with said at least one locking or fastening element in the body interface; and wherein the seating interface is operatively engaged with the body interface to connect the child seating apparatus to the body; and wherein at least a portion of the seatback portion extends higher than the lower window extent.

* * * * *